United States Patent [19]
Armstrong

[11] 3,862,316

[45] Jan. 21, 1975

[54] LIQUID S-METHYL N-(METHYLCARBAMOYL) OXY) THIOACETIMIDATE INSECTICIDAL COMPOSITIONS

[75] Inventor: Johnny Leroy Armstrong, Hockessin, Del.

[73] Assignee: E. I. du Pont de Nemours and Company, Wilmington, Del.

[22] Filed: Dec. 22, 1972

[21] Appl. No.: 317,802

[52] U.S. Cl. ............................ 424/173, 424/300
[51] Int. Cl. ........................ A01n 9/12, A01n 9/20
[58] Field of Search ................ 425/300, 311, 173

[56] References Cited
UNITED STATES PATENTS

| | | | |
|---|---|---|---|
| 3,576,834 | 4/1971 | Buchanan | 424/304 X |
| 3,639,633 | 2/1972 | Buchanan | 424/327 |
| 3,647,861 | 3/1972 | Buchanan | 424/311 |

Primary Examiner—Albert T. Meyers
Assistant Examiner—Allen J. Robinson

[57] ABSTRACT

Liquid, water-soluble concentrates of S-methyl N-[(methycarbomyl)oxy]thioacetimidate containing 20–30 percent by weight of said thioacetimidate dissolved in a solvent consisting essentially of 80–95 percent by weight of methanol and 5–20 percent by weight of water. Compositions of S-methyl N-[(methylcarbamoyl)oxy]thioacetimidate are useful as insecticides.

3 Claims, 1 Drawing Figure

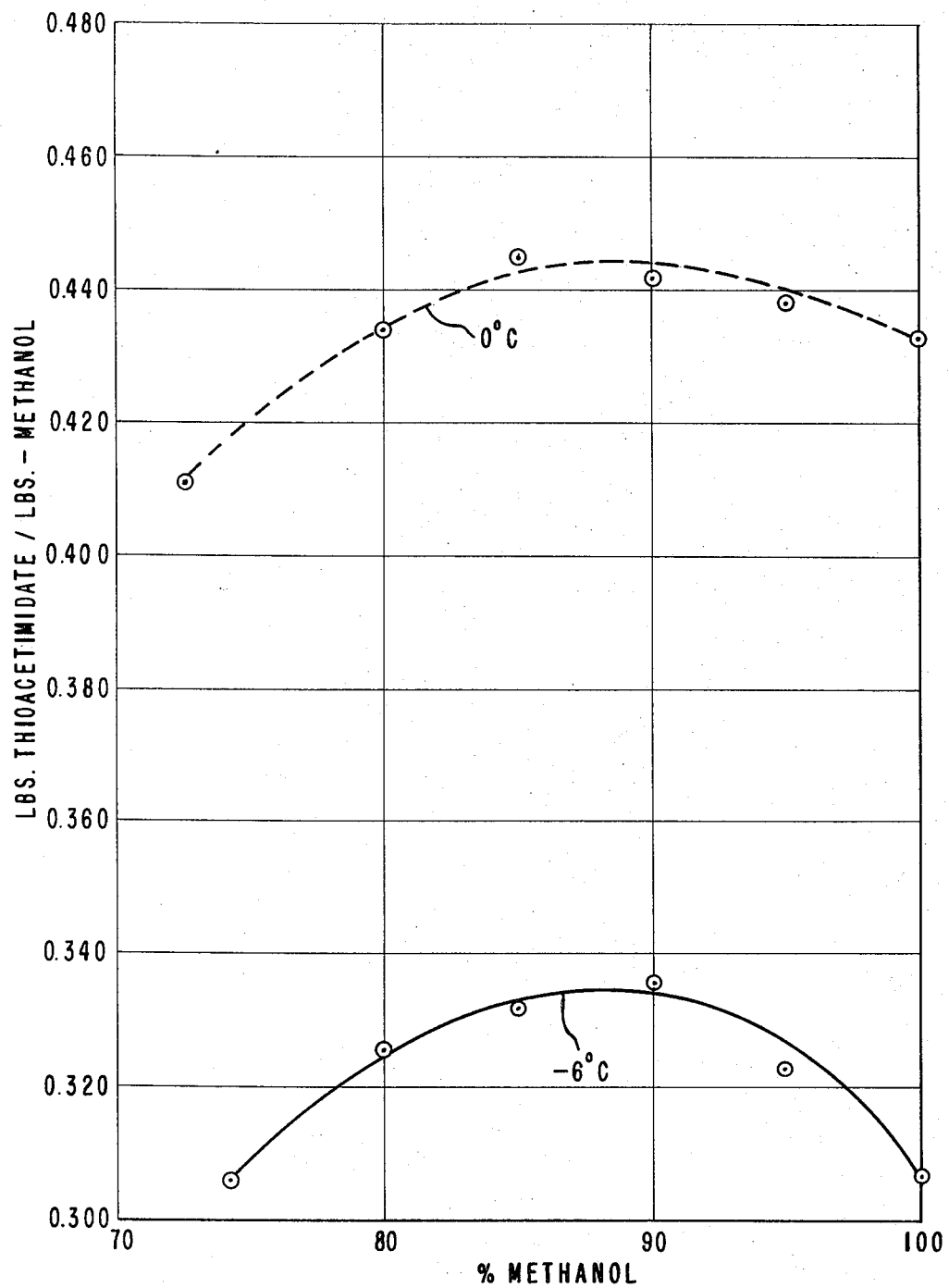

3,862,316

LIQUID S-METHYL N-(METHYLCARBAMOYL) OXY) THIOACETIMIDATE INSECTICIDAL COMPOSITIONS

BACKGROUND OF THE INVENTION

Insecticidal compositions exist in a wide variety of formulations. Liquid formulations are among the most useful of these since they are convenient to handle, easily measured, quick to disperse in water, and lend themselves to low-volume applications. Liquid formulations eliminate the toxic dust problem normally associated with dry formulations. As compared to conventional solid formulations, they are easier to dilute to spray volume. Liquid concentrates can be pumped; and even when used in small amounts, liquid formulations can be more conveniently and accurately measured than solid formulations.

The active insecticidal ingredient, S-methyl N-[(methylcarbamoyl)oxy]thioacetimidate, a method of making it, and a wide variety of formulations and methods for using it are disclosed in U.S. Pat. No. 3,647,861, issued Mar. 7, 1972, to James B. Buchanan. Included is an insecticidal composition containing 25% S-methyl N-[(methylcarbamoyl)oxy]-thioacetimidate dissolved in a solvent consisting of 60 percent methanol and 40 percent water. Related disclosures are found in U.S. Pat. Nos. 3,639,633 and 3,576,834, issued Feb. 1, 1972 and Apr. 27, 1971, respectively, to James B. Buchanan.

The solubility of said thioacetimidate in water is low. At room temperature, an aqueous solution of said thioacetimidate becomes saturated at a concentration of about 5–6 percent by weight. In contrast, the solubility of said thioacetimidate in methanol is high, and room temperature saturation of a methanolic solution will occur at about 60 percent by weight. It is known that increasing the methanol concentration in a binary solvent system consisting essentially of methanol and water increases the amount of said thioacetimidate that can be safely put into solution, i.e., without risk of crystallization at low temperatures, such as near freezing or sub-freezing temperatures. It would be expected that the solubility of said thioacetimidate in such a binary solvent would increase in approximate proportion to the increase in methanol concentration of the solvent. It has now been found unexpectedly that this linear relationship does not exist, but rather an optimum occurs when the solvent falls in the range of 80–95 percent by weight of methanol and 5–20 percent by weight of water. By using a solvent consisting essentially of 80–95 percent by weight methanol and 5–20 percent by weight of water, not only is a low crystallization point achieved, but higher thioacetimidate to methanol ratios are also achieved. That is, in the concentration range mentioned above, more of said thioacetimidate can be safely dissolved per unit methanol than with any other methanol/water mixtures.

SUMMARY OF THE INVENTION

This invention is an improved composition of S-methyl N-[(methylcarbamoyl)oxy]thioacetimidate dissolved in a methanol/water mixture. The improvement comprises formulating said composition such that it contains 20–30 percent by weight of said thioacetimidate dissolved in a solvent system consisting essentially of 80–95 percent by weight of methanol and 5–20 percent by weight of water. The improved composition of the present invention can be made by direct dissolution of solid, particulate S-methyl N-[(methylcarbamoyl)oxy]thioacetimidate in an appropriate quantity of the above-mentioned solvent system. A more convenient way, however, would be to bring into contact the required quantities of the above-mentioned solvent and the molten product which results from the process which is the subject matter of copending U.S. patent application Ser. No. 317,803, filed simultaneously herewith, by Robert J. Vollkommer. As pointed out therein, so doing has the advantage of dissolving and cooling said thioacetimidate simultaneously. The resulting composition possesses more of said thioacetimidate per unit methanol than is possible with other methanol/water solvents as well as a low crystallization point.

DESCRIPTION OF THE FIGURE

This optimum is depicted graphically in the Figure. The graph shown therein plots pounds of S-methyl N-[(methylcarbamoyl)oxy]thioacetimidate per pound of methanol as a function of the methanol/water ratio (percent of methanol in the solvent system) at the given crystallization points of 0°C. and −6°C. These curves represent the maximum amount of said thioacetimidate that will remain dissolved in a mixture of solution and crystals (i.e., an equilibrium mixture) at the indicated temperatures and methanol/water ratios. The methanol/water ratio represents the concentrations of methanol and water in the solvent system in which the thioacetimidate is dissolved and not the concentrations of methanol and water in the finished product. The maximum ratio in the curves represents the formulation which requires the least expenditure of methanol per unit of thioacetimidate, methanol being the costly solvent in the system.

The above-mentioned optimum becomes particularly important when concentrated solutions of said thioacetimidate, i.e., those containing more than 20 percent by weight of said thioacetimidate, are likely to encounter near freezing or subfreezing temperatures.

DETAILED DESCRIPTION OF THE INVENTION

The improved composition of this invention comprises a liquid, water-soluble concentrate of S-methyl N-[(methylcarbamoyl)oxy]thioacetimidate

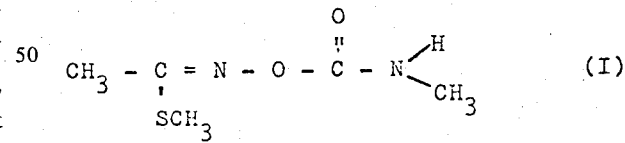

containing 20–30 percent by weight of said thioacetimidate dissolved in a solvent consisting essentially of 80–95 percent by weight of methanol and 5–20 percent by weight of water. A preferred composition comprises from about 23 percent to about 26 percent of said thioacetimidate dissolved in a solvent consisting essentially of about 85–95 percent methanol and about 5–15 percent water. A composition comprising about 25 percent of said thioacetimidate in a solvent consisting essentially of about 90 percent methanol and about 10 percent water is most preferred since this composition permits the highest safe thioacetimidate/methanol ratio of any methanol/water mixture, while maintaining a crystallization point below 0°C.

Compositions of the present invention can also contain minor amounts (i.e., from about 0.001-0.1 percent by weight) of coloring agent. Any coloring agent or combination of coloring agents that does not react chemically with the other ingredients of the composition may be used. Suitable coloring agents include the sodium, calcium and ammonium lignosulfonates such as the "Marasperses," manufactured by American Can Company, "Polyfons," manufactured by Westvaco Corporation, and "Lignosols," manufactured by Lignosol Chemicals (see *McCutcheon's Detergents and Emulsifiers* 1972 Annual, published 1972 by McCutcheon's Division, Allured Publishing Company) as well as organic dyes such as FD&C Blue No. 1, FD&C Red No. 3 or FD&C Yellow No. 5 (see *The Food Chemical News Guide*, published Feb. 28, 1972 by Food Chemical News, Inc.). "Marasperse CB" and "FD&C Blue No. 1" are preferred.

The liquid, water-soluble concentrates of the present invention are effective against an enormous variety of pests as described in detail in the abovementioned U.S. Pat. No. 3,639,633, and may be diluted with water, methanol or water/methanol mixtures. Broadly speaking, the active ingredient should normally be used at levels of about 0.05 kg/hectare to about 35 kg/hectare.

Certain preferred embodiments of this invention are illustrated by the following Example 1. In addition, the solubility characteristics of S-methyl N-[(methylcarbamoyl)oxy]thioacetimidate in various methanol/water mixtures are discussed in detail in the following Example 2. In these examples all ratios and percentages are by weight.

EXAMPLE 1

Formulations of the following compositions are prepared by dissolving S-methyl N-[(methylcarbamoyl)oxy]thioacetimidate and the coloring agent in the methanol/water solvent system at ambient temperature under a blanket of nitrogen. The solution is clarified by conventional filtration techniques.

| A. | thioacetimidate | 25.0% |
|---|---|---|
|  | "Marasperse" CB | 0.025% |
|  | 90:10 methanol:water | Balance |
| B. | thioacetimidate | 20.0% |
|  | FD&C Blue No. 1 | 0.001% |
|  | 80:20 methanol:water | Balance |
| C. | thioacetimidate | 30.0% |
|  | "Marasperse" CB | 0.10% |
|  | 95:5 methanol:water | Balance |

EXAMPLE 2

Solutions of S-methyl N-[(methylcarbamoyl)oxy]thioacetimidate were prepared in the methanol/water solvent system listed below and stored at 0° and −6°C. until temperature equilibrium was obtained. Each sample was seeded with crystals of said thioacetimidate to initiate crystallization. After at least 24 hours, 5 ml. of the supernatant liquid was transferred cold to a tared vial and sealed. After the vial and contents warmed to room temperature, they were weighed and the solution was transferred to a tared dish and evaporated to dryness. The remaining thioacetimidate solids were weighed and the weight ratios of thioacetimidate/methanol in the various solvent systems at the given temperature were calculated. The ratios of thioacetimidate to methanol in solution at the given temperature were plotted as a function of the methanol/water solvent ratio. The following table illustrates the results of this test. Graph 1 is a plot of this data and illustrates the benefit of adding small amounts of water to conserve methanol.

| Solvent System (wt.ratio) | | Solubility of Methomyl | | Methomyl/Methanol | |
|---|---|---|---|---|---|
| $H_2O$ | Methanol | 0°C. | −6°C. | 0°C. | −6°C |
| 0 | 100 | 30.24% | 23.5% | 0.433 | 0.307 |
| 5 | 95 | 29.39% | 23.5% | 0.438 | 0.323 |
| 10 | 90 | 28.46% | 23.2% | 0.442 | 0.336 |
| 15 | 85 | 27.43% | 22.0% | 0.445 | 0.332 |
| 20 | 80 | 25.76% | 20.7% | 0.434 | 0.326 |
| 25.8* | 74.2* | — | 18.5% | — | 0.306 |
| 27.3* | 72.7* | 23.01 | — | 0.411 | — |

* obtained from solubility curve.

I claim:

1. An insecticidal composition having a low crystallization point comprising 20 to 30 percent by weight of S-methyl N-[(methylcarbamoyl)oxy]thioacetimidate dissolved in a solvent consisting of 80–95 percent by weight of methanol and 5–20 percent by weight of water.

2. The insecticidal composition of claim 1 wherein 23–26 percent by weight of said thioacetimidate is dissolved in a solvent consisting of 85–95 percent by weight of methanol and 5–15 percent by weight of water.

3. The insecticidal composition of claim 1 wherein about 25 percent by weight of said thioacetimidate is dissolved in a solvent consisting of about 90 percent by weight of methanol and about 10 percent by weight of water.

* * * * *